INVENTORS.
EDMUND E. HOSKINS
ROBERT M. MOORE
BY
ATTORNEYS.

Patented June 26, 1945

2,378,925

UNITED STATES PATENT OFFICE 2,378,925

SEISMIC PROSPECTING SYSTEM

Edmund E. Hoskins, and Robert M. Moore, Pasadena, Calif., assignors, by mesne assignments, to United Geophysical Company, Pasadena, Calif., a corporation of California Application July 24, 1939, Serial No. 286,200

14 Claims. (Cl. 177—352)

This invention relates to seismic surveying and in particular relates to an amplifier for reproducing seismic waves. According to our invention, the input impedance of a seismic wave amplifier is varied inversely as a function of the strength of signals received. By limiting the strength of signals impressed on the amplifier tubes of a seismic wave amplifier, we prevent distortion from overload of said tubes and facilitate the operation of any automatic amplitude control unit associated with the amplifier.

The objects of our invention are to provide a means and method for varying the gain of a seismic wave amplifier in accordance with the strength of signals impressed on the amplifier input; to provide a means and method for limiting the strength of signals impressed on the first tube of a seismic wave amplifier; to provide a means and method for varying the input impedance of a seismic wave amplifier inversely as a function of the signal strength; to provide a means and method for reducing the input impedance of a seismic wave amplifier when the input signal strength exceeds a predetermined value.

Our invention possesses numerous other objects and features of advantage, some of which, together with the foregoing, will be set forth in the following description of specific apparatus embodying and utilizing our novel method. It is therefore to be understood that our method is applicable to other apparatus, and that we do not limit ourselves, in any way, to the apparatus of the present application, as we may adopt various other apparatus embodiments, utilizing the method, within the scope of the appended claims.

Referring to the drawing.

Figure 1:
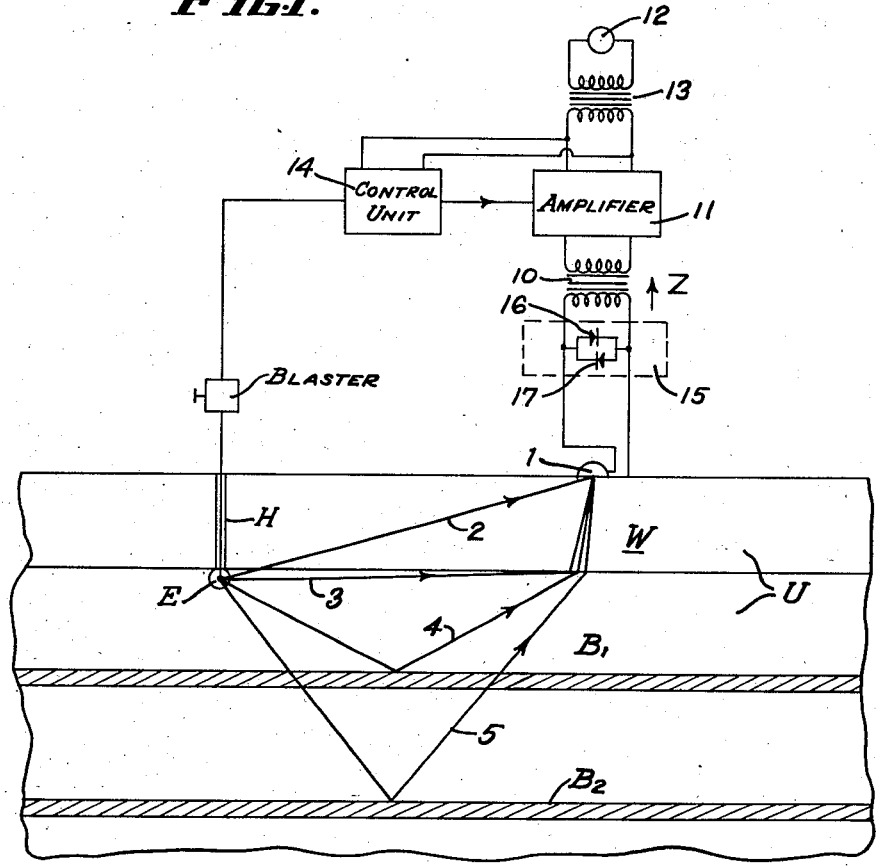
Fig. 1 is a schematic diagram of a preferred embodiment of our invention.

Referring to Fig. 1, U represents a vertical cross section of the earth wherein W is the weathered layer and $B_1$ and $B_2$ are reflecting layers. Waves generated by the detonation of an explosive E at the bottom of shot hole H are propagated in all directions. Receptor I adapted to convert seismic waves into corresponding electrical waves receives waves generated by charge E. Some of these waves travel directly to the receptor through the weathered layer W by a path 2 in the weathered layer; other received waves traverse a refraction path 3; while still other waves are returned to receptor I along paths 4 and 5 after reflection from the beds $B_1$ and $B_2$.

The electrical waves generated by receptor I in response to seismic waves are transmitted through amplifier input transformer 10, amplified by vacuum tubes in amplifier 11, and reproduced visually by recording galvanometer 12 connected to the secondary of amplifier output transformer 13.

It is well known that the seismic waves received in seismic prospecting are composed of a train of waves which exists for a considerable time interval, the train of waves sometimes lasting as long as eight or more seconds. The first waves arriving at the receptor are refracted waves which travel through the high velocity layer directly beneath the weathered layer. The refracted waves are of a very high amplitude compared with other received waves and usually last for only several tenths of a second. The received reflected waves are of generally gradually diminishing amplitude and persist for a much longer time. The direct waves or ground roll may arrive at any time during the reception of the other waves depending on the distance between the reception point and the shot point. Ground roll is generally of a very low frequency and has an amplitude comparable to that of some of the reflected waves. It is understood, of course, that the absolute amplitude of the waves appearing in a seismic wave train depends to a large extent on the size of the explosive used for initiating the wave train as well as upon the seismic wave transmission characteristics of the earth.

Though the total variation of amplitude between the largest and smallest reflected waves received in a single seismic wave train may differ by as much as 80 or 90 decibels, it is desirable to compress these waves into a small amplitude range, in order to make a record thereof which may be readily studied visually. However, in making such a record it is essential to preserve the general character of the waves over several cycles thereof, even though the relative amplitude level of different incoming waves is radically modified during the recording process. Such compression may be brought about over at least the limited range of reflected seismic waves by the use of the volume control systems described in the patent applications referred to below.

The refracted waves themselves, except for the first part thereof used in producing the first break, are of such a high amplitude compared with the reflected waves that they may be conveniently attenuated prior to application to a seismic wave amplifier without in any way affecting the legibility of the recorded reflected waves. It is desirable to record the very first part of this refracted wave as a sharp first break, thus facilitating the determination of the time of arrival of the first part of the wave train in order to make accurate corrections for the variation in the velocity and thickness of the weathered layer from one reception point to another. By attenuating waves exceeding a predetermined amplitude, we are able to apply refracted waves to the amplifier without affecting the sharp character of the first break and without disabling the amplifier to such an extent that it is unable to control the recording of the reflected waves.

Preferably we attenuate the excessively high amplitude waves instantaneously as a function of their amplitude prior to applying these waves to the amplifier, thus preventing amplifier overload even for a short time.

In order to produce a suitable visual record in which the excursion of the oscillograph traces lies within practical or convenient limits, we utilize control unit 14 to vary the gain of amplifier 11 during the reception of the waves. Said control unit 14 may be any gain control device which varies the gain of amplifier 11 as a predetermined function of time, as in the copending United States application of Herbert Hoover, Jr., entitled Seismic exploration system, Serial No. 286,171, filed July 24, 1939, as a function of amplifier output signal strength, or partly as a predetermined function of time and partly as a function of output signal strength as in copending U. S. application of Herbert Hoover, Jr., entitled Method and apparatus for recording seismic waves, Serial No. 286,172, filed July 24, 1939.

With any type of the gain control unit 14 the range of operation is limited to a certain extent by many factors met in practice. For instance, the amount of permissible gain control bias which can be impressed on amplifier 11 by control unit 14, is limited by the time constants of the circuits used as part of said control unit 14. Furthermore, the maximum amplitude of the signals derived from receptor 1 varies from one setup to another, and under some conditions, if the signals are impressed on the amplifier directly, they will overload and may completely disable the amplifier for a time during the early part of the recording.

In order to overcome the above difficulties we have provided a system in which signals exceeding any predetermined amplitude are attenuated prior to being impressed on the first tube of amplifier 11. To achieve this result we shunt the amplifier input with a variable impedance 15 the value of which decreases with increase of the amplitude of incoming signals. The maximum value of the variable input impedance should preferably be equal to or larger than the impedance looking back toward receptor 1, and the minimum value should be smaller than the impedance looking back toward receptor 1.

The variable impedance 15 which we prefer to use consists of two copper oxide rectifiers 16 and 17 connected in parallel with opposite poles connected together. Two copper oxide rectifiers so connected in parallel have an effective A. C. resistance which is a function of the amplitude voltage impressed thereon.

Figure 2:
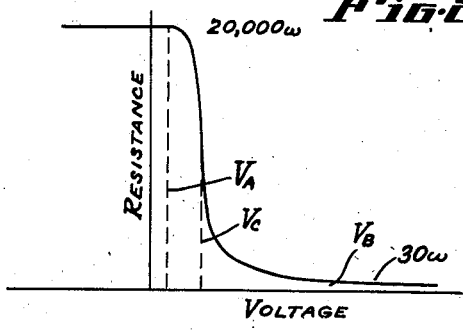
Fig. 2 is a graph of the D. C. characteristic of a half wave copper oxide rectifier.

The D. C. characteristic of a single copper oxide rectifier is typified by the graph in Fig. 2. For voltages impressed in one direction across a rectifier the resistance is very high as indicated by the constant portion of the graph to the left of the resistance axis. For small voltages of the opposite sign, as $V_A$, the resistance is about the same; for large voltages as $V_B$ the resistance is very low; and at an intermediate voltage around $V_C$ the resistance varies rapidly with voltage. These relations are indicated by the graph of Fig. 2.

For convenience the voltage $V_C$ at which the change of resistance with voltage is a maximum may be referred to as the flex point voltage of the voltage resistance curve.

As is well known to those skilled in the art the maximum and minimum resistances and the flex point voltage of a rectifier depend on the dimensions and materials of the rectifier.

One copper oxide rectifier which we have found useful in conjunction with our invention has maximum and minimum resistances of about 20,000 ohms and 30 ohms respectively and a flex point at about 0.1 or 0.2 volt. The resistance of this rectifier closely approaches its minimum value at about 0.5 or 0.8 volt. We use two of such rectifiers connected in opposed parallel relation as a variable impedance on the input of a seismic wave amplifier, in order to reduce the amplifier signal input greatly when the seismic wave received exceeds a predetermined amplitude; and thereby prevent overloading of the amplifier.

If impedance Z looking into the primary of transformer 10 is 300 ohms, the load impedance comprising Z and variable resistance 15 connected to the output of seismometer 1 varies from about 300 ohms to about 27 ohms depending on the input signal strength.

With our invention, small signals, corresponding to reflected waves, produce voltages less than about 0.1 volt and appear in the secondary of transformer 10 substantially unmodified by the presence of variable attenuator 15.

Large signals, however, such as those due to first arrivals which have traversed a refraction path 3 or direct waves traversing a path 2 in the weathered layer W cause the impedance 15 to be lowered in value. Accordingly such signals are attenuated before amplification; and overload and disabling of the amplifier 11 precluded.

For simplicity, the variable impedance comprising transformer 10 and rectifiers 16 and 17 may be regarded as part of the amplifier 11. In one broad sense, then, our invention consists in varying the amplifier input impedance as a function of the strength of the impressed signals thus varying the amplifier sensitivity.

Since the first part of any transient wave impressed on the system is amplified without attenuation, our invention makes possible producing a sharp first break corresponding to the beginning of a seismic wave train.

By virtue of a change in input impedance, a reduction of sensitivity occurs immediately following the first break if the signals exceed a predetermined value of about 0.1 volt. The input impedance increases as the amplitude of the impressed signals decreases and for small signals the gain of the amplifier is governed solely by control unit 14.

While we have described our invention with reference to a particular embodiment in which a variable input impedance is used to vary the sensitivity of an amplifier, it is clear that such variable impedance could be utilized at some other point of the amplifier and still take advantage of the principles of our invention.

Preferably, however, we use a variable impedance prior to the first tube of amplifier 11. In this manner we keep the tube from drawing grid current when large signals are received and consequently prevent blocking of the amplifier which might result from this cause.

It is to be understood that we do not wish to be limited in any manner to the particular apparatus described but only by the scope of the appended claims.

We claim:

1. Apparatus for seismic prospecting comprising an amplifier with input and output respectively connected to a seismic wave receptor and a reproducer, means acting to vary the gain of said amplifier in a predetermined manner during the reception of seismic waves, and separate means responsive to input signals for attenuating large input signals exceeding a predetermined signal strength to a different degree than small input signals prior to application of the signals to said amplifier.

2. Apparatus for seismic prospecting comprising an amplifier with input and output respectively connected to a seismic wave receptor and a reproducer, means responsive to the amplifier output for varying the gain of said amplifier inversely as a function of amplifier output signal strength, and separate means responsive to input signals for attenuating large input signals more than small input signals prior to application of the signals to said amplifier.

3. Apparatus for seismic prospecting comprising an amplifier with input and output respectively connected to a seismic wave receptor and a reproducer, means acting to vary the gain of said amplifier in a predetermined manner during the reception of seismic waves, and a variable impedance comprising two copper oxide rectifiers connected in parallel opposed relation across the input of said amplifier whereby the overall sensitivity of said apparatus is reduced for signals exceeding a predetermined strength.

4. In the art of seismic prospecting utilizing a seismic wave amplifier having input and output connected respectively to a receptor and a reproducer, the steps which comprise converting a received seismic wave train into a corresponding electric wave train, amplifying the first part of the initial impuse of said electric wave train with little attenuation to produce a sharp first break, and beginning immediately thereafter attenuating all signals in said electric wave train exceeding a predetermined level in response to signal amplitude prior to application of said signals to said amplifier to prevent amplifier overload.

5. Apparatus for seismic prospecting comprising a seismic wave amplifier with input and output connected respectively to a seismic wave receptor and a reproducer, a coupling transformer connecting said amplifier and said receptor, and a bilateral non-linear resistance shunting the primary of said transformer, said resistance having the property of varying inversely as a function of the strength of electric signals exceeding a predetermined amplitude level applied across it but of having a substantially constant maximum value for applied electrical waves below said predetermined amplitude level, whereby large electric signals above said level generated by said receptor are automatically attenuated more than weaker waves prior to transmission to said amplifier.

6. In a method of reproducing electrical waves corresponding to explosion generated seismic waves received at a point in the earth, the improvement which comprises attenuating any of said corresponding electrical waves lying within a predetermined amplitude range in accordance with and in response to their strength, subsequently amplifying the attenuated electrical waves and unattenuated waves of smaller amplitude than the waves that were attenuated, and varying the degree of amplification of the amplified electrical waves as an inverse function of the amplitude of said amplified waves to maintain the amplitude of the amplified signal between limits suitable for recording as an oscillograph trace over a time period including the first arrival time of said received waves.

7. In a method of reproducing electrical waves corresponding to explosion generated seismic waves received at a point in the earth, the improvement which comprises attenuating said corresponding electrical waves an amount varying as an increasing function of and in response to their strength, which amount is substantially negligible for electrical waves falling below a predetermined level, and subsequently amplifying the attenuated electrical waves an amount varying inversely as a function of the amplitude of the attenuated waves to maintain the amplitude of the amplified signal between limits suitable for recording as an oscillograph trace over a time period including the first arrival time of said received waves.

8. In the method of reproducing a train of explosion generated seismic waves which includes converting received seismic waves into a train of corresponding electrical waves, and passing the said corresponding electrical waves through an amplifying stage to a recording stage, the improvement which comprises attenuating strong electrical waves in said train exceeding a predetermined amplitude prior to application to the amplification stage in response to the strength of said strong electrical waves, and applying weak signals in said train falling below said predetermined amplitude to the amplification stage without substantial prior attenuation.

9. In apparatus for seismic prospecting having an amplifier with an input and an output, a receptor adapted to convert a train of explosion generated seismic waves into corresponding electrical waves, connected to said input and a reproducer connected to said output, means connected between the receptor and the amplifier responsive to the strength of incoming electrical waves in said train for attenuating only incoming electrical waves exceeding a predetermined amplitude by an amount varying as a direct function of strength thereof and attenuating weaker incoming signals a lesser and substantially constant amount.

10. In combination with an amplifier having an input and an output, automatic volume control means connecting the output to a gain control element in the amplifier, separate means connected prior to the amplifier input responsive to incoming signal currents greater than a predetermined value to provide large attenuation for said signals prior to application thereof to the amplifier and also responsive to incoming signal currents of values smaller than said predetermined value to provide attenuation of greatly reduced value as compared to said large attenuation prior to application of the smaller signals to the amplifier input.

11. In combination with an amplifier having an input and an output, automatic volume control means connecting the output to a gain control element in the amplifier, separate means connected prior to the amplifier input for attenuating incoming signals before they are applied to the amplifier input, said means being responsive to incoming signal currents and providing relatively small and substantially constant attenuation for incoming signals having amplitudes smaller than a predetermined value and larger attenuation for stronger signals, the larger attenuation increasing with the strength of said stronger waves.

12. In apparatus for use in seismic surveying, the combination with a seismometer for converting incoming seismic energy into electrical wave form signals and means for amplifying and recording such signals, said amplifying and recording means including automatic volume control devices responsive to variation in received seismic energy, and devices responsive only to received seismic energy of amplitude which is excessively large as compared to the amplitude of reflected waves for rapidly reducing the sensitivity of said amplifying and recording means.

13. An apparatus for recording artificially produced seismic waves which include waves travelling from the source to the seismic detector through the surface layers of the earth and waves received from underlying strata of the earth, the surface waves being the first to arrive and comprising an initial weak vibration followed by very strong vibrations of progressively diminishing magnitude, and the waves received from underlying strata comprising a series of wave trains, said wave trains and the individual waves in each wave train diminishing in relative energy substantially as a function of time, comprising a seismic detector for converting the seismic waves into oscillating electrical signals, amplifying means for amplifying said signals, means adapted to record said amplified signals, means for controlling the sensitivity of the amplifying means in such a way that it amplifies the electrical signal created by the initial vibration of the surface wave with maximum sensitivity and amplifies signals created by the successive wave trains from underlying strata with a sensitivity which is initially low but increases as the strength of said wave trains diminishes, and means responsive to the arrival of surface waves of intensity which is excessively high as compared to the intensity of reflected waves for rapidly reducing the sensitivity of the amplifying means.

14. In apparatus for use in seismic surveying, the combination with a seismometer for converting incoming seismic energy into electrical wave form signals and means for amplifying and recording such signals, said amplifying and recording means including automatic volume control devices responsive to variation in received seismic energy, and devices responsive to received seismic energy of amplitude which is excessively large as compared to the amplitude of reflected waves normally acceptable by and affecting said amplifying and recording means for rapidly reducing the effect of the excess energy on said amplyifying and recording means.

EDMUND E. HOSKINS.
ROBERT M. MOORE.